United States Patent
Daniel et al.

(10) Patent No.: US 8,543,176 B1
(45) Date of Patent: Sep. 24, 2013

(54) METHOD AND SYSTEM FOR OPTIMIZING IMPEDANCE MATCH IN A MOBILE COMMUNICATION DEVICE

(75) Inventors: Tom T. Daniel, Monmouth Jct., NJ (US); Padmanabha Rajagopalan, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 567 days.

(21) Appl. No.: 12/633,495

(22) Filed: Dec. 8, 2009

(51) Int. Cl.
*H04M 1/00* (2006.01)

(52) U.S. Cl.
USPC .............. 455/575.7; 455/575.5; 455/550.1; 343/860; 343/861; 343/850; 343/702

(58) Field of Classification Search
USPC .......... 455/575.7, 575.4, 575.3, 550.1, 575.6; 343/860, 861, 702, 850
See application file for complete search history.

(56) References Cited

U.S. PATENT DOCUMENTS

| | | | | |
|---|---|---|---|---|
| 5,923,297 A * | 7/1999 | Kim et al. | .................... | 343/702 |
| 7,603,150 B2 * | 10/2009 | Takahashi | .................. | 455/575.3 |
| 2004/0008151 A1 * | 1/2004 | Kurihara | ...................... | 343/860 |
| 2005/0195121 A1 * | 9/2005 | Paek | ............................ | 343/860 |
| 2007/0210899 A1 * | 9/2007 | Kato et al. | ............... | 340/310.15 |
| 2008/0300027 A1 * | 12/2008 | Dou et al. | ...................... | 455/574 |
| 2011/0285603 A1 * | 11/2011 | Skarp | ........................... | 343/860 |

* cited by examiner

*Primary Examiner* — Marcos Torres (57) ABSTRACT

A mobile communication device has a number of selectable states, an antenna, and a communication circuit for transmitting and receiving communication signals. The mobile device also includes an impedance matching circuit having impedance matching networks. Each impedance matching network is associated with at least one of the selectable states of the mobile communication device and is configured to optimize the impedance match between the communication circuit and the antenna based on the selectable state of the mobile communication device with which the impedance matching network is associated. A switching network is included for coupling the antenna to the communication circuit together using one of the impedance matching networks based on a selected state of the mobile communication device.

12 Claims, 4 Drawing Sheets

METHOD AND SYSTEM FOR OPTIMIZING IMPEDANCE MATCH IN A MOBILE COMMUNICATION DEVICE

TECHNICAL FIELD

The present subject matter relates to techniques and equipment optimizing the impedance match between the antenna and the communication circuit of the mobile communication device that has a plurality of states.

BACKGROUND

In recent years, there has been a substantial increase in the use of mobile communication devices for voice telephone services among mobile professionals and throughout the more general consumer population. In addition to providing voice telephone service, many mobile communication devices provide additional capabilities, such as email or text messaging services and even multimedia services. There are a variety of approaches that designers of mobile communication devices with multi-function capabilities provide for a user to input data into the mobile communication device in order to dial a phone number, create e-mail and text messages, and use other multimedia services. As mobile communication devices become increasing smaller, one approach is to use a reduced keypad, such as a telephone keypad, for dialing phone numbers, creating email and text messages, and using multimedia services. In this approach, the telephone keypad includes a fewer keys than letters in the alphabet, and each of the keys corresponds to a multiple characters. Various known methods have been developed for entering and displaying desired text using such types of reduced keypads. However, as the features of mobile device become more complex, a reduced keypad often becomes a limiting factor in accommodating and supporting all of the available features on the mobile communication device. In addition, although reduced keypads of the type described above have been developed, users of mobile communication devices tend to find it more comfortable and efficient to enter text when creating e-mail and text messages using a complete text keyboard.

Another method of providing multi-function capability is to provide a mobile communication device with a complete text keyboard, such as one having a standard QWERTY layout familiar to typists. In this approach, the QWERTY keyboard is provided on the face of the device and includes a complete set of alphanumeric keys and provides functions of dialing phone numbers, creating e-mail and text messages, and using multimedia services. However, as the demand for smaller mobile communication devices increases, the complete text keyboard has become a limiting factor in meeting this demand.

In an effort to satisfy the demand for miniature mobile communication devices that provide full voice and data communication capabilities while also retaining comfort and efficiency of entering text with complete keyboards, there have been developed mobile communication devices that include a telephone keypad on the face of the device and a complete text keyboard concealed behind a portion of the mobile communication device. Typically, these types of mobile communication devices have a body that includes at least a first housing and a second housing that is movably connected to the first housing. The second housing is capable of moving from a closed physical state relative to the first housing to an open physical state relative to the first housing. When the device is "closed" in such a manner, the complete text keyboard is concealed; whereas when the device is "open," the complete text keyboard is exposed. In the closed physical state, the mobile communication device operates in a first mode of operation, which is typically a telephone call (i.e., voice) mode, and the telephone keypad on the face of the device is used to dial phone numbers. During the closed physical state, the complete text keyboard is hidden from the view of the user. When the mobile communication device is used in a second mode of operation, such as to create and send an e-mail message or text message, or for accessing multimedia services (i.e., data mode), the housing is moved to the open physical state thereby exposing the concealed complete text keyboard. The complete text keyboard can be used to enter text for the e-mail or text message, or for use with multimedia services. Example of the types of mobile communication devices that have a telephone keypad on the face of the device and a complete text keyboard concealed behind a portion of the mobile communication device include slider-type devices, flip-type devices, and folder-type devices.

Typically, manufactures of mobile communication devices design the devices to perform optimally in their first mode of operation, which is typically the voice mode, since wireless communication carriers and industry standards, such as CTIA, test the device for this mode of operation. In order to provide optimal performance, the antenna in the mobile communication device is tuned to provide maximum total radiated power in the first mode of operation. One method of tuning an antenna is to provide an impedance matching circuit between the antenna and the communication circuit in order to set the input impedance of the communication circuit equal to the impedance of the antenna.

The mobile communications device may include a variety of states that affect the performance of the antenna, such as, for example, the physical state of the device, the positional state of the device, or the operational state of the device. With regard to the physical state of the device, as explained above, the device may be used in a closed state for certain modes of operation and an open state for other modes of operation. For example, as explained above, slider-type, flip-type, and folder type devices typically operate in the first mode of operation when the second housing is positioned so as to conceal the complete text keyboard which is on the first housing (i.e., closed physical state). When the mobile device is to be used in its second mode of operation, such as for creating and sending e-mail or text messages, the second housing is moved relative to the first housing so as to expose the complete text keyboard (i.e., open physical state). When the second housing is moved to relative to the first housing for use in the second mode of operation, the performance of the antenna is degraded due to the antenna being detuned, as the antenna is optimized for performance when the device is in a closed physical state.

The positional state of the device may also affect the performance of the antenna. One type of positional state that can affect performance of the antenna is whether the device is in a hand-held position or a free-space position. For example, many mobile communication devices can be used in hand-held or handsfree modes of operation. Typically, when the device is being used in the hand-held mode of operation, the device is in the hand-held state such that it is being held by the user during operation. Conversely, when the device is being used in the handsfree mode of operation, the device is typically being used in the free-space state such that it does not need to be held by the user during operation. Many mobile communication devices are designed to provide optimal radiated power when the device is being used in one these positional states, such as for example, a hand-held position. Thus, when the device is being used in other positional states, such as free-space position, the antenna can become detuned and lead to a reduction in the total radiated power of the mobile communication device.

Operational states, such as whether the device is being used in voice mode or data mode, can also affect the radiated performance of the antenna. For example, many mobile devices are designed to perform optimally in certain modes of operation, such as voice mode. In order to provide optimal performance, the antenna in the mobile communication device is tuned to provide maximum total radiated power in these modes of operation. When the device is used in other modes of operation, such as data mode, the antenna may become detuned leading to reduced performance of the antenna. Reduced performance of the antenna reduces performance of the mobile device.

Since the antenna is a passive device, it cannot be tuned to multiple physical states, positional states, and operation states of the device based on the various conditions that may exist. Hence, there is a need to improve a mobile communication device's antenna radiated performance for multiple device states.

SUMMARY

The teachings herein alleviate one or more of the above noted problems with antenna detuning due to the state of the mobile communication device, for example, by optimizing the impedance match between the antenna and the communication circuit of the mobile communication device for different modes or states of the mobile device. In one example of an exemplary solution, a mobile communication device having a plurality of selectable states comprises an antenna and a communication circuit for transmitting and receiving communication signals. The selectable states may include an open state, a closed state, a hand-held state, a free-space state, a data mode state, or a voice mode state, or any combination thereof.

The mobile communication device also includes an impedance matching circuit having a plurality of impedance matching networks. Each impedance matching network is associated with at least one of a plurality of selectable states of the mobile communication device and is configured to optimize the impedance match between the communication circuit and the antenna based on the selectable state of the mobile communication device with which the impedance matching network is associated. A switching network is included for coupling the antenna to the communication circuit with one of the impedance matching networks based on a selected state of the mobile communication device.

The impedance matching circuit may include a first impedance matching network associated with a first selected state of the mobile communication device and a second impedance matching network associated with a second selected state of the mobile communication device. The first impedance matching network couples the antenna to the communication circuit when the mobile communication device is in the first selected state, and the second impedance matching network couples the antenna to the communication circuit when the mobile communication device is in the second selected state. The first and second impedance matching networks may include at least one common element. Alternatively, the first impedance matching network may include a first set of circuit elements and the second impedance matching network may include a second set of circuit elements wherein the first set of circuit elements are distinct from the second set of circuit elements.

The switching network may include a first switching network and a second switching network. The first switching network couples the antenna to a selected one of the impedance matching networks based on the selected state of the mobile communication device with which the one selected matching networks is associated. The second switching network couples the communication circuit to the selected impedance matching networks based on the selected state of the mobile communication device with which the other impedance matching networks is associated. In this manner, the selected impedance matching circuit couples the antenna to the communication circuit so as to optimize the impedance match between the communication circuit and the antenna based on the selected state of the mobile communication device with which the impedance matching network is associated.

In an example, the mobile communication device also includes a sensor for detecting the selected state of the mobile communication device, for example, to detect the open/closed physical state of the device. In such an example, the switching network receives a control signal indicative of the selected state of the mobile communication device from the sensor and couples the antenna to one of the plurality of impedance matching networks based on the received control signal.

The examples below also encompass an article of manufacture for use in a mobile communication device having a communication circuit, an antenna, and a plurality of selectable states. The of selectable states may include an open state, a closed state, a hand-held state, a free-space state, a data mode state, or a voice mode state, or any combination thereof. The article of manufacture includes an impedance matching circuit having a plurality of impedance matching networks. Each impedance matching network is associated with at least one of a plurality of selectable states of the mobile communication device. Each impedance matching network is configured to optimize the impedance match between the communication circuit and the antenna based on the state of the mobile communication device with which the particular impedance matching network is associated. The article of manufacture also includes a switching circuit for coupling an antenna to a communication circuit, with one of the impedance matching networks, based on receiving a control signal indicative of a selected state of the mobile communication device.

The impedance matching circuit may include a first impedance matching network associated with a first selected state of the mobile communication device and a second impedance matching network associated with a second selected state of the mobile communication device. The first impedance matching network couples the antenna to the communication circuit when the mobile communication device is in the first selected state and the second impedance matching network couples the antenna to the communication circuit with the mobile communication device is in the second selected state. The first impedance matching network and the second impedance matching network may comprise at least one common circuit element. Alternatively, the first impedance matching network may comprise a first set of circuit elements and the second impedance matching network may comprise a second set of circuit elements wherein the first set of circuit elements are distinct from the second set of circuit elements.

The switching network may include a first switching network for coupling the antenna to a selected one of the plurality of impedance matching networks based on a state of the mobile communication device with which the selected one of the plurality of impedance matching networks is associated.

The switching netwok may also include a second switching network for coupling the communication circuit to the selected impedance matching network based on the state of the mobile communication device with which the selected impedance matching networks is associated. In this manner, the selected impedance matching circuit couples the antenna to the communication circuit so as to optimize the impedance match between the communication circuit and the antenna based on the selected state of the mobile communication device with which the impedance matching network is associated. The switching network may receive a control signal indicative of the selected state of the mobile communication device from a sensor and couples the antenna to one of the plurality of impedance matching networks based on the received control signal.

The disclosed examples also include a physical program product comprising a computer usable storage medium having an executable program code embodied therein is provided. Execution of the executable program code by a mobile communication device having a plurality of states, an antenna, and a communication circuit causes the mobile communication device to implement functions for coupling one of a plurality of impedance matching networks to an antenna in the mobile communication device. The plurality of selectable states may include an open state, a closed state, a hand-held state, a free-space state, a data mode state, or a voice mode state, or any combination thereof. The functions comprise receiving a control signal indicative of a selected state of the mobile communication device and coupling an antenna to communication circuit with one of a plurality of impedance matching networks based on the received control signal. The impedance matching network that couples the antenna to the communication circuit is associated with the selected state of the mobile communication device and is configured optimized the impedance match between the communication circuit and the antenna based on the selected state of the mobile communication device.

The physical program product may also include executable computer readable code for implementing the function of coupling the antenna to the communication circuit with a first impedance matching network associated with a first state of the mobile communication device when the mobile communication device is in the first state and coupling the antenna to the communication circuit with a second impedance matching network associated with a second state of the mobile communication device when the mobile communication device is in the second state. The first impedance matching network and the second impedance matching network comprise at least one common circuit element. Alternatively, the first impedance matching network may comprise a first set of circuit elements and the second impedance matching network may comprise a second set of circuit elements wherein the first set of circuit elements are distinct from the second set of circuit elements.

In addition, the physical program product may include executable computer readable code for implementing the function of coupling the antenna to the one of the plurality of impedance matching networks with a first switching network based on the selected state of the mobile communication device and coupling the communication circuit to the one of the plurality of impedance matching networks with a second switching network based on the selected configuration of the mobile communication device. In this manner, the selected impedance matching circuit couples the antenna to the communication circuit so as to optimize the impedance match between the communication circuit and the antenna based on the selected state of the mobile communication device with which the impedance matching network is associated Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIB. 1B illustrates the wireless device of FIG. 1A in the form of a slider-type mobile communication device in an open physical state.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various technologies disclosed herein relate to improving the antenna performance of a mobile communication device having a plurality of physical, positional and/or operation states by providing a plurality of impedance matching networks and coupling one of the impedance matching networks to the antenna based on the current state of the mobile communication device.

Figure 1A:
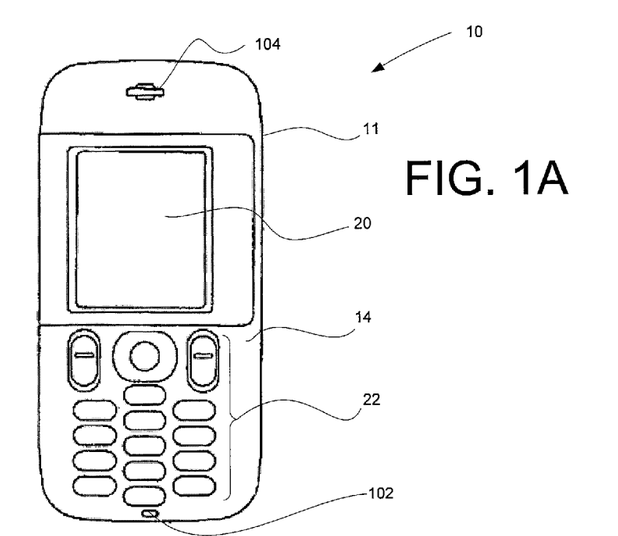
FIG. 1A illustrates a wireless device in the form of a slider-type mobile communication device in a closed physical state.
Figure 1B:
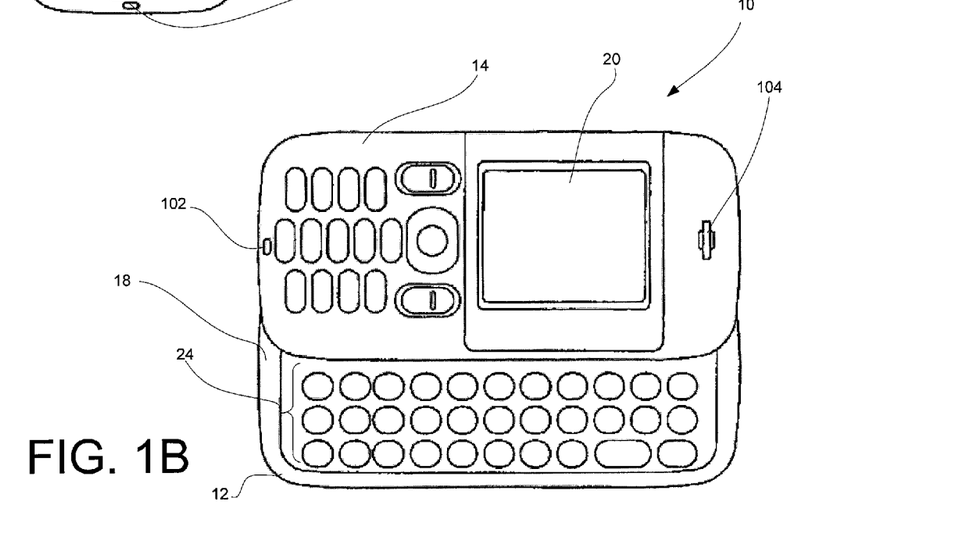

Reference now is made in detail to the examples illustrated in the accompanying drawings and discussed below. FIGS. 1A illustrates a wireless device 100 in the form of a slider-type mobile communication device 10 in a closed physical state and FIG. 1B illustrates the slider-type mobile communication device 10 in an open physical state. The slider-type mobile communication device 10 includes a body 11 having a first housing 12 and a second housing 14 that substantially covers the first housing 12 when the mobile device is in a closed physical state. The first and second housings 12, 14 are attached to one another in a manner that allows for the second housing 14 to slide, in at least one direction, with respect to the first housing 12 such that the internal face 18 of the first housing 12 becomes exposed and the surface area of the entire slider type portable mobile communication device 10 is increased. An inner keypad 24 is disposed on the exposed internal face 18 of the first housing 12. Therefore, in the open physical state (i.e., FIG. 1B), the user has access to the inner keypad 24 whereas in the closed physical state (i.e., FIG. 1A), the user is unable to access the inner keypad 24. Typically, the slider-type mobile communication device 10 operates in certain modes of operation, such as voice mode, when the mobile communication device 10 is in the closed physical state, and operates in other mode of operations, such as creating and sending e-mail and text messages, when the device 10 is in the open physical state. It is also contemplated that the certain modes of operation can be used when the device 10 is in either the open or closed physical states.

The slider-type mobile communication device 10 may also be utilized in different positional states based on whether the device is being used in a hand-held or handsfree mode of operation. When the device 10 is being used in the hand-held mode of operation, the device 10 is typically in a hand-held positional state such that is being held by a user during operation, such as, for example, up to the user's ear. When the device 10 is being used in a handsfree mode of operation, the device 10 is typically in a free-space positional state such that it does not have to be held by the user during operation of the device 10. However, it is understood that when the device 10 is being used in the handsfree mode of operation, the device 10 may still be in a hand-held positional state such that it is being held in the user's hand, but not being held to the user's ear. Typically, during voice mode when the device 10 is in the free-space positional state, a handsfree device (not shown) is coupled to the mobile communication device 10 by a short-range wireless communication protocol, such as by Bluetooth® communication. The handsfree device may also be coupled to the device 10 when the device 10 is in a handsfree mode of operation but in a hand-held positional state. The handsfree device may include, for example, Bluetooth headsets, hands-free car kits (HFCK), and personal navigation devices (PND). However, it is contemplated that other methods and communication protocols may be utilized with the device 10 during handsfree mode.

Referring again to FIG. 1A, when the slider-type mobile communication device 10 is in the closed physical state, the device 10 typically operates in a first mode of operation, such as voice mode. It is understood that the device 10 may also operate in other modes of operation while in the closed physical state. The second housing 14 includes a first aperture which provides an opening for a microphone 102 for audio signal input and a second aperture which provides an opening for a speaker 104 for audio signal output. The second housing 14 also includes various interface elements, such as an outer display 20 and an outer keypad 22.

The outer display 20 can used for displaying several types of information, such as messages, menus, or the like, call related information dialed by the user, calling party numbers, etc. When the device 10 is in the closed physical state, the information on the outer display 20 is typically presented in portrait mode, but can also be presented in landscape mode. As will be described herein, information can also be presented in either portrait or landscape mode based on the orientation of the device 10. The outer keypad 22 typically includes numeric keys, but may include other non-numeric keys, to provide user interface functions to access and use various features of the mobile communication device 10 while in modes of operation for use when the device 10 is in the closed physical state. For example, the outer keypad 22 may provide an interface for dialing digits for voice calls as well as generating selection inputs, for example, as may be keyed-in by the user based on a displayed menu or as a cursor control and selection of a highlighted item on the outer display 20. The outer display 20 and outer keypad 22 are physical interface elements providing a textual or graphical user interface for use when the device 10 is in the closed physical state. In addition to normal telephone communication related input/output, these elements also may be used for display of menus and other information to the user and user input of selections, if needed during a system operation when the device is in the closed physical state. Of course other user interface elements may be used, such as a stylus and touch sensitive display screen, as in a PDA or smart phones.

As discussed above, the second housing 14 is capable of being slid in a direction thereby causing the slider-type mobile communication device 10 to be in an open physical state and operate in a certain modes of operation, such as entering and sending e-mail or text messages. As can be seen in FIG. 1B, when the mobile communication device 10 is in the open physical state, the inner keypad 24 is exposed and can provide user interface functions to access and use various features of the device 10 while in the modes of operation for use when the device 10 is in the open physical state. Typically, when the device 10 is in the open physical state, the outer display 20 and inner keypad 24 are the physical elements providing a graphical and textual user interface. The inner keypad 24 may include a complete text keyboard, such as a QWERTY keyboard, as well as additional keys to provide additional user input selections. For example, the inner keypad 24 is an interface element that may provide an interface for typing an e-mail or text messages, accessing and navigating Internet websites, as well as generating selection inputs, for example, as may be keyed-in by the user based on a displayed menu or as a cursor control and selection of a highlighted item on the outer display 20. When the device 10 is in the open physical state, the information on the outer display 20 is typically presented in landscape mode, but may also be presented in portrait mode. Further, as will be described herein, information can also be presented in either portrait or landscape mode based on the orientation of the device 10. In addition to normal data communication related input/output, outer display 20 and inner keypad 24 may be used for display of menus and other information to the user and user input of selections, if needed during a system operation when the device 10 is in the open physical state. Of course, as in the closed physical state, other user interface elements may be used, such as a stylus and touch sensitive display screen, as in a PDA or smart phones. In addition, the first aperture provides an opening for a microphone 102 for audio signal input and a second aperture which provides an opening for a speaker 104 for audio signal output can also be used when the device 10 is in the open physical state.

Figures 2A, 2B:
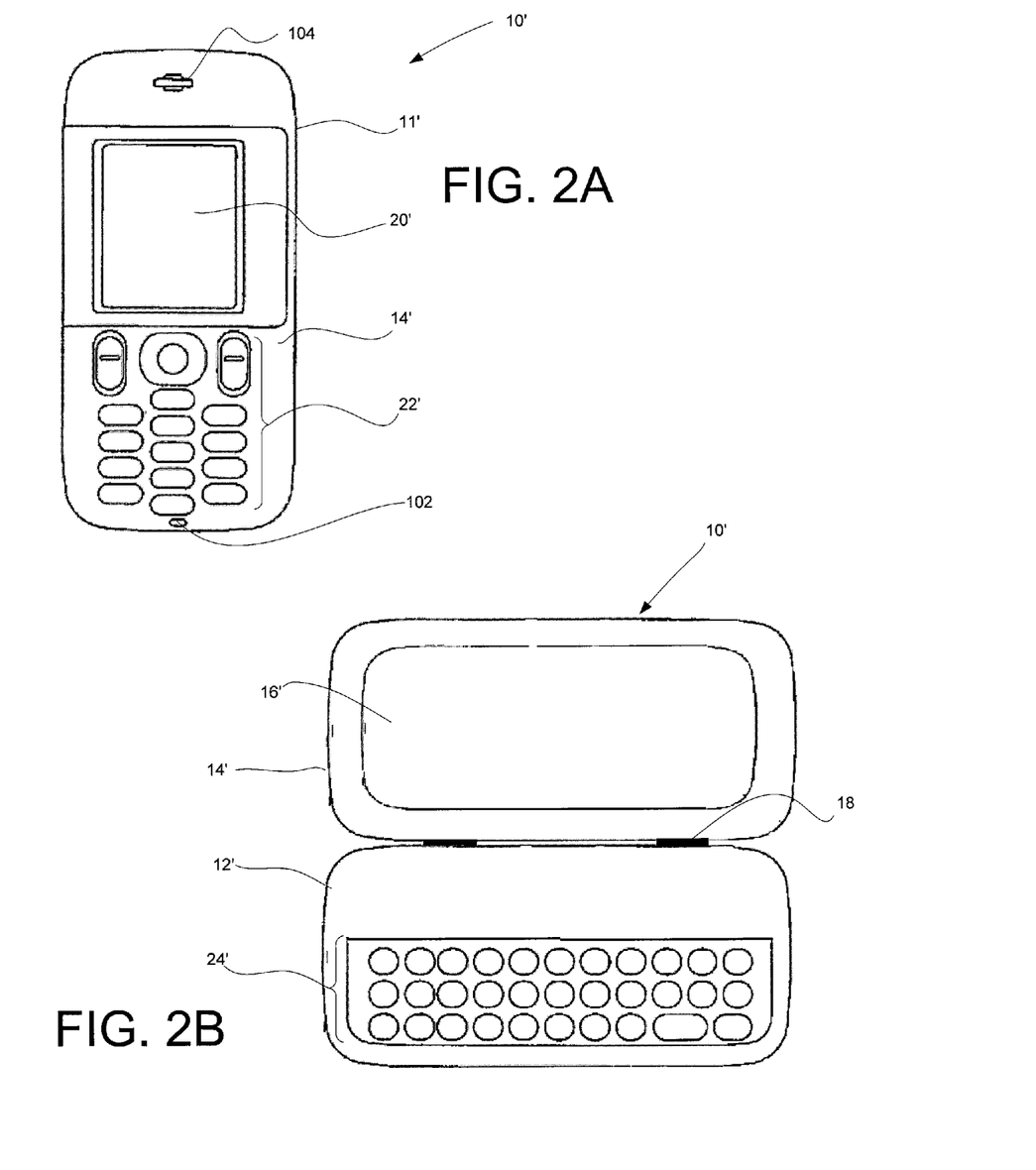
FIG. 2A illustrates a wireless device in the form of a folder-type mobile communication device in a closed physical state.
FIG. 2B illustrates a wireless device in the form of a folder-type mobile communication device in an open physical state.

FIG. 2A illustrates a wireless device 100 in the form of a folder-type mobile communication device 10' in a closed physical state and FIG. 2B illustrates the slider-type mobile communication device 10' in an open physical state. Components of the folder-type mobile communication device 10' which are similar to the components to the slider-type mobile communication device 10 are identified with an apostrophe after the reference numeral.

The folder-type mobile communication device 10' includes interface elements that are similar to the interface elements of the slider-type mobile communication device 10. As with the slider-type mobile communication device 10, typically, the folder-type mobile communication device 10' operates in certain modes of operation, such as voice mode, when the device 10' in the closed physical state and operate in certain mode of operations, such as creating and sending e-mail and text messages, when the device 10' is in the open physical state. The folder-type mobile communication device 10' includes a body 11' having a first housing 12' and a second housing 14' that substantially covers the first housing 12' when the mobile device 10' is in a closed physical state. The first and second housings 12', 14' are attached to one another in a manner that allows for the second housing 14' to move between a closed physical state and an open physical state with respect to the first housing 12' such that the inner keypad 24' on the first housing 12' and the inner display 16' on the second housing 14' become exposed and the surface area of the entire folder-type mobile communication device 10' is increased. Therefore, as with the slider-type mobile communication device 10, when the folder-type communication device 10' is in the open physical state (i.e., FIG. 2B), the user has access to the inner keypad 24' whereas in the closed physical state (i.e., FIG. 2A), the user is unable to access the inner keypad 24'. The second housing 14' may be connected to the first housing 12' by a hinge or a swivel, or any other means which allow the second housing 14' to move from the closed physical state to the open physical state.

Similar to the slider-type mobile communication device 10, the folder-type communication device 10' may also be utilized in either hand-held or handsfree modes of operation. When the device 10' is being used in the hand-held mode of operation, the device 10' is typically in a hand-held positional state such that is being held by a user during operation, such as up to the user's ear. When the device 10' is being used in a handsfree mode of operation, the device 10' is typically in a free-space positional state and does not have to be held by the user during operation of the device 10'. However, as with slider-type mobile communication device 10, it is understood that when the folder-type mobile communication device 10' is being used in the handsfree mode of operation, the device 10' may still be in a hand-held positional state such that it is being held in the user's hand, but not being held to the user's ear. Typically, during voice mode when the device 10' is in the free-space positional state, a handsfree device (not shown) is coupled to the mobile communication device 10' by a short-range wireless communication protocol, such as by Bluetooth® communication. The handsfree device may also be coupled to the device 10' when the device is in a handsfree mode of operation but in a hand-held positional state. The handsfree device may include, for example, Bluetooth headsets, hands-free car kits (HFCK), and personal navigation devices (PND). However, it is contemplated that other methods and communication protocols may be utilized with the device 10' during handsfree mode.

As with the slider-type mobile communication device 10, when the folder-type mobile communication device 10' is in the closed physical state, the device 10' typically operates in voice mode. The second housing 14' includes a first aperture to provide an opening for a microphone 102 for audio signal input and a second aperture to provide an opening for a speaker 104 for audio signal output. The second housing 14' also includes various interface elements, such as an outer display 20' and an outer keypad 22'. The outer display 20' can used for displaying various information, such as messages, menus, or the like, call related information dialed by the user, calling party numbers, etc. When the device 10' is in the closed physical state, the information on the outer display 20' can be presented in either portrait mode or landscape mode. As will be described herein, information can also be presented in either portrait or landscape mode based on the orientation of the device 10'.

The outer keypad 22' typically includes numeric keys, but may include other non-numeric keys, to provide user interface functions to access and use various features of the mobile communication device 10' while in certain modes of operation used when the device 10' is in the closed physical state. For example, the outer keypad 22' may provide an interface for dialing digits for voice calls as well as generating selection inputs, for example, as may be keyed-in by the user based on a displayed menu or as a cursor control and selection of a highlighted item on the outer display 20'. The outer display 20' and outer keypad 22' are physical interface elements providing a textual or graphical user interface for use when the device 10' is in the closed physical state. In addition to normal telephone communication related input/output, these elements also may be used for display of menus and other information to the user and user input of selections, if needed during a system operation when the device is in the closed physical state. Of course other user interface elements may be used, such as a stylus and touch sensitive display screen, as in a PDA or smart phones.

As discussed above, the second housing 14' can flip open thereby causing the folder-type mobile communication device 10' to be in an open physical state and operate in a second mode of operation, such as entering and sending e-mail and text messages. As can be seen in FIG. 2B, when the folder-type mobile communication device 10' is in the open physical state, the inner keypad 24' and an inner display 16' are exposed. The inner keypad 24' can provide user interface functions to access and use various features of the device 10 while in the second mode of operation and the inner display 16' for displaying information, such as, messages, menus, or the like, e-mail and text message related information, or text relating to other data communication. When the device 10' is in the open physical state, the information on the inner display 16' can be presented in either portrait mode or landscape mode. As will be described herein, information can also be presented in either portrait or landscape mode based on the orientation of the device 10'. Typically, when the device 10' is in the open physical state, the inner keypad 24' and outer display 16' are the physical elements providing a graphical and textual user interface. The inner keypad 24' may include a complete text keyboard, such as a QWERTY keyboard, as well as additional keys to provide additional user input selections. For example, the inner keypad 24' is an interface element that may provide an interface for typing an e-mail or text messages, accessing and navigating Internet websites, as well as generating selection inputs, for example, as may be keyed-in by the user based on a displayed menu or as a cursor control and selection of a highlighted item on the inner display 16' in landscape mode. In addition to normal data communication related input/output, inner display 16' and inner keypad 24' may be used for display of menus and other information to the user and user input of selections, if needed during a system operation when the device 10' is in the open physical state. Of course, as in the closed physical state, other user interface elements may be used, such as a stylus and touch sensitive display screen, as in a PDA or smart phones. In addition, when the folder-type mobile communication device 10' is in the open physical state, the device 10' may include a separate microphone and speaker for use in the open physical state or may use the same microphone and speaker that is used when the device is in the closed physical state.

Figure 3:
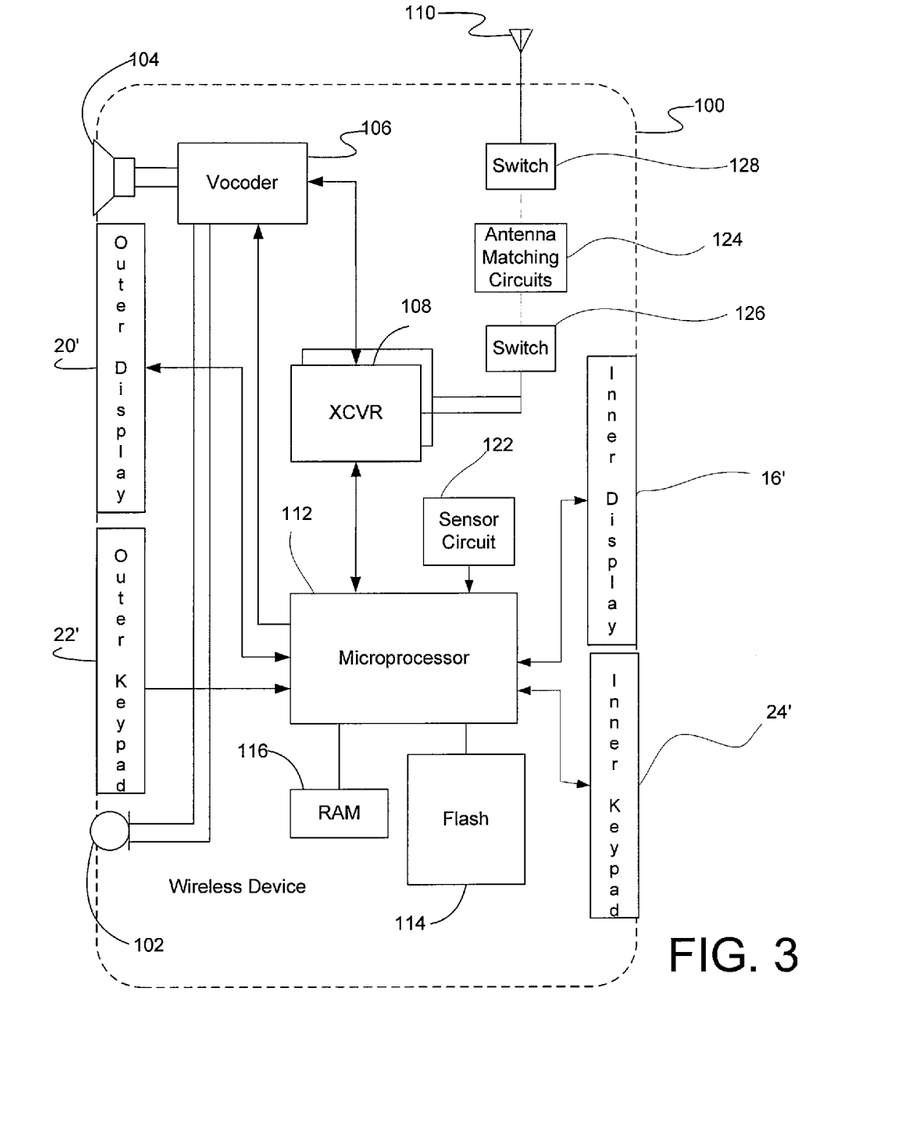
FIG. 3 is a block diagram illustration of an exemplary wireless device.

FIG. 3 provides a block diagram illustration of an exemplary wireless device 100 which may be used in connection with a slider-type mobile communication device 10 or a folder-type communication device 10', or any type of mobile communication device that is capable of being used in multiple states, such as open physical state, closed physical state, hand-held positional state, or handsfree positional state, or multiple operational states, such as voice-mode, data mode, hand-held mode, and/or handsfree mode. Although the wireless device 100 may be a mobile communication device or may be incorporated into another device, such as a portable personal computer, personal digital assistant (PDA) or the like, for discussion purposes, the illustration shows the wireless device 100 in the form of a folder-type mobile communication device 10' illustrated in FIGS. 2A and 2B. However, it is understood that the following discussion applies to the slider-type mobile communication device 10 shown in FIGS. 1A and 1B, as well as any type of mobile communication device capable of being used in multiple physical, positional, or operational states.

In this example, the wireless device 100 includes a communication circuit 101. For the purpose of the description herein, the communication circuit 101 may include a microphone 102, a speaker 104, a vocoder 106, a transceiver 108, a microprocessor 112, a flash type program memory 114, a RAM 116, an outer display 20, an outer keypad 22, an inner keypad 24 and an inner display 16', or any subset of these components.

The wireless device 100 and functions as a normal digital wireless telephone station and uses the communication circuit 101 for that function. As stated above, the communication circuit 101 may include a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communication or voice over packet (Internet Protocol) communication.

For digital wireless communication, the communication circuit 101 may include a digital transceiver (XCVR) 108. The handset 100 is a multimode device capable of operations on various technology type networks, such as W-CDMA, CDMA or GSM technologies. For example, the handset 100 may utilize either or both of 3GPP2 (1XRTT/EVDO/EVDV) technologies and 3GPP (LTE/GSM/UMTS) technologies. For that purpose, the transceiver (XCVR) 108 could be a multimode transceiver, or the handset 100 may include two or more transceivers each of which supports a subset of the various technologies or modes. The concepts discussed here encompass embodiments of the station 100 utilizing any digital transceivers that conform to current or future developed digital wireless communication standards.

The transceiver 108 provides two-way wireless communication of information, such as vocoded speech samples and/or digital message information, in a selected one of the technology modes. The transceiver 108 also sends and receives a variety of signaling messages in support of the various voice and data services provided via the station 100 and a communication network. Each transceiver 108 connects through RF send and receive amplifiers (not separately shown) to an antenna 110. In the example, the transceiver 108 is configured for RF communication in accord with a digital wireless protocol, such as the current 3GPP2 and 3GPP protocols. For the network selection function, network communication via the transceiver 108 and antenna 110 will include detection of the available network technology types in any given service area and selection of an available network for communication. The network communication may also support downloading of selection programming and list data and/or updates thereof from a server such as the OTAF server 29.

When used in a folder-type mobile communication device 10', the communication circuit 101 may include the outer display 20, outer keypad 22, inner display 16', and inner keypad 24. As explained above, the outer display 20, the outer keypad 22, the inner display 16', and the inner keypad 24 provide the textual and graphical user interface for the folder-type mobile communication device 10'. When used in a slider-type mobile communication device 10, the wireless device 100 is coupled to the outer display 20, outer keypad 22, and inner keypad 24. As explained above, the outer display 20, the outer keypad 22, and the inner keypad 24 provide textual and graphical user interface for the slider-type mobile communication device 10. Further, to the any additional user interfaces are used, the wireless device 100 may also coupled to any such user interfaces.

The communication circuit 101 may include a microprocessor 112. The microprocessor 112 serves as a programmable controller for the wireless device 100, in that it controls all operations of the wireless device 100 in accord with programming that it executes, for all normal operations, and for operations involved in selecting a preferred technology and selecting an available network of the appropriate technology type, for mobile communication. In the example, the wireless device 100 includes flash type program memory 114, for storage of various "software" or "firmware" program routines and mobile configuration settings, such as mobile directory number (MDN) and/or mobile identification number (MIN), etc. The wireless device 100 may also include a computer readable storage medium, such as flash type program memory 114 or a non-volatile random access memory (RAM) 116 for a working data processing memory. Of course, other storage mediums and devices or configurations may be added to or substituted for those in the example. In one implementation, a flash type program memory stores firmware such as a boot routine, device driver software, an operating system, call processing software and vocoder control software, and any of a wide variety of other applications, such as client browser software and short message service software. The computer readable storage mediums, such as RAM 116 may also store various data, such as telephone numbers and server addresses, downloaded data such as multimedia content, and various data input by the user. Programming may be stored in the flash type program memory, sometimes referred to as "firmware," is loaded into and executed by the microprocessor 112. Those skilled in the art will recognize, however, that executable program code for the mobile device such as that controlling the selection of the matching impedance may at times reside on or in other storage media, such as any of the memories of other storage devices embodied in a server or other computer that stores the programming before installation in the memory within the mobile device.

The communication circuit 101 may include at least one sensor circuit 122 for sensing one or more states of the mobile communication device 10'. As will be described in greater detail below, the sensor circuit 122 may include different types of sensors for detecting different types of physical, positional and operational states of the device 10'. Upon sensing the state of the device 10', the sensor circuit 122 sends a control signal indicative of the state of the device 10' to the microprocessor to begin appropriate actions consistent with the detected device 10' state. Such actions may be for example, to illuminate certain keypads or displays, or allow certain modes of operation.

In one example, the sensor circuit 122 may include a slider or flip sensor to detect if the device 10' is in an open physical state or a closed physical state. In order to detect whether the device 10' is in an open of closed physical state, the sensor circuit 122 may utilize sensors such as a magnetic sensor or a mechanical sensor. For example, the sensor circuit 122 may employ a magnet (not shown) located in the second housing 14' in connection with a Hall sensor (not shown) located in the first housing 12'. When the device 10' is in the closed physical state, the magnet located in the second housing 14' approaches the Hall sensor in the first housing 12' thereby creating a relatively strong magnetic field that can be detected by the sensor circuit 122. Based upon detection of the relatively strong magnetic field, the sensor circuit 122 sends a control signal to the microprocessor 112 indicating that the device 10' is in the closed physical state. In response, the microprocessor may begin appropriate actions consistent with detection of the closed physical state, such as turning off the inner display 16' and inner keypad 24. When the second housing 14' is moved away from the first housing 12' to cause the device 10' to be in an open physical state, the magnet moves away from the Hall sensor resulting in a relatively weaker magnetic field. Upon detecting the relatively weaker magnetic field, the sensor sends a control signal to the microprocessor indicating that the device 10' is in the open physical state. In response, the microprocessor 112 may begin actions consistent with detection of the open physical state, such as illuminating the inner display 16' and inner keypad 24. In addition, as will be described in greater detail below, the sensor circuit 122 may send a control signal to a switching circuit 126, 128 indicating whether the device 10' is in an open physical state or a closed physical state.

In another example, the sensor circuit 122 may include a proximity sensor that detects how close the mobile communication device 10' is to a user's body. For example, the proximity sensor may detect how close the mobile communication device 10' is to the body of the user. This permits the wireless device 100 to detect when the device 10' is being held in a user's hand or has been brought up a user's ear during voice mode. The proximity sensor may be a standard proximity sensor, such as an optical, heat, or magnetic sensor that is typically used in mobile communication devices. When the proximity sensor detects that the device 10' is being held in the user's hand or has been brought up to the user's ear, the sensor circuit 122 may send a control signal to the microprocessor indicating that the device 10' is being held in the user's hand or is being held near the user's ear. In response, the microprocessor 112 may perform certain functions, such as deactivating the outer display 20 when the device 10' is near the ear of the user. The microprocessor 112 may also stop detecting touches of the outer keypad 22 to avoid inadvertent input from the user's face and ear until the device 10' is taken away from the user's face. In addition, as will be described in greater detail below, the sensor circuit 122 may send a control signal to the switching circuit 126, 128 indicating the positional state of the device 10' with respect to the user's hand or user's ear.

The sensor circuit 122 may also include an orientation sensor for detecting the positional state with respect to the orientation of the mobile communication device 10, 10'. The orientation sensor may be, for example, an accelerometer that senses the orientation of the mobile communication device 10', and in particular, the outer display 20' or inner display 16'. The sensor circuit 122 sends a control signal to the microprocessor 112 indicating the orientation of the device 10'. In response, based on the orientation, the microprocessor may display information on the outer display 20' or the inner display 16' in either portrait mode or landscape mode, which ever is appropriate for the detected orientation of the device 10'. In addition, as will be described in greater detail below, the sensor circuit 122 may send a control signal to the switching circuit 126, 128 indicating the orientation of the device 10'.

It is contemplated that the various types of sensors described above may be formed either as a single sensor circuit or as multiple sensor circuits. When multiple sensors used in a single sensor circuit 122, the control signal sent by the sensor circuit 122 to the microprocessor 112 may indicate more than one type of state of the device 10'. For example, if the flip slider detects that the device 10' is in the closed physical state and the proximity sensor detects the positional state of the device as not being near the user's face, the control signal may indicate both of these states. In response, the microprocessor may take appropriate actions consistent with the device 10' being in the closed physical state and not being proximate the face of the user, such as for example, allow operation of voice mode and allow illumination of the outer display 20. Similarly, if the control signal indicates that the device 10' is in the open physical state and is in a positional state such that the device is being held in a manner where the width of the screen is longer then height of the screen, (as illustrated in FIG. 2B), the microprocessor may illuminate the inner display 16', display information in landscape mode, and allow operation in data mode. In addition, the switching circuit 126, 128 may also receive one or more control signals from multiple sensor circuits that indicate more than one type of states of the device 10'.

The wireless device 100 includes an impedance matching circuit 124 and a switching network 126, 128 for selectively coupling the impedance matching circuit 124 to the antenna 110 and communication circuit 101. The antenna matching circuit 124 optimizes the transfer of power between the antenna 110 and the communication circuit 101 by matching the impedance of the communication circuit 101 and the antenna 110 based on a selected states of the mobile communication device 10.

Figure 4:
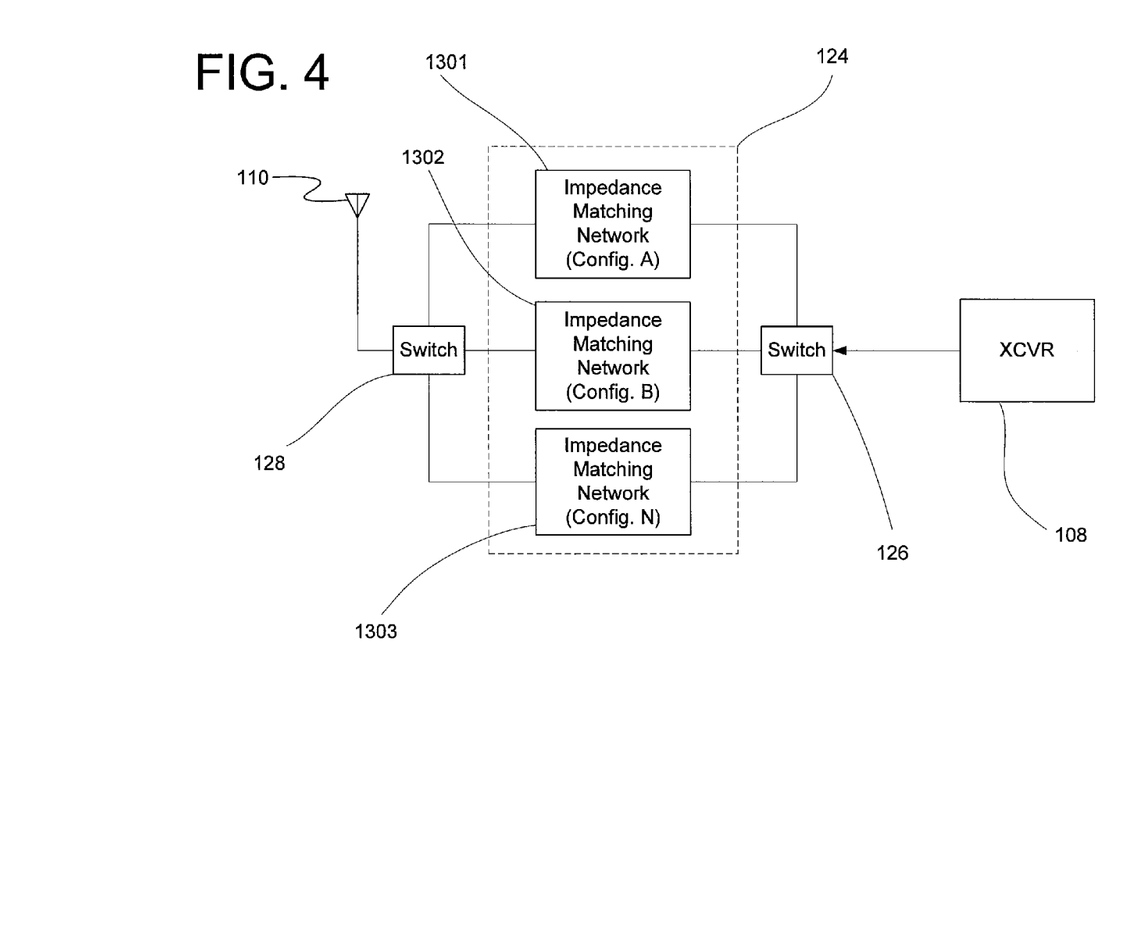
FIG. 4 is a block diagram illustration of an exemplary impedance matching circuit and switching network for a wireless device.

FIG. 4 illustrates an example of an impedance matching circuit 124 and switching network 126, 128. The impedance matching circuit 124 includes a plurality of impedance matching networks 1301, 1302, 1303. Although three impedance matching networks are illustrated in FIG. 4, it is understood that the impedance matching circuit 124 may include fewer impedance matching networks (e.g. two) or may include more than three impedance matching networks. The impedance matching networks 1301, 1302, 1303 may be passive or active impedance matching networks. Each impedance matching network 1301, 1302, 1303 may comprise circuit elements, such as transformers, resistors, inductors, and capacitors that are arranged in a manner to match the input impedance of the communication circuit 101 with the fixed output impedance of the antenna 110. In one example, the impedance matching networks 1301, 1302, 1303 are designed with resistors due to the relative ease of design and the ability to deliberately limit power transfer when used with low-power signals, such as radio frequency signals. However, the impedance matching networks 1301, 1302, 1303 may be designed in a manner known to those of ordinary skill in the art.

Each impedance matching network 1301, 1302, 1303 may comprise a set of circuit elements that are separate from the circuit elements of other impedance matching networks 1301, 1302, 1303, or the impedance matching networks 1301, 1302, 1303 may share circuit elements. In a scenario where impedance matching circuits 1301, 1302, 1303 share common circuit elements, the switching network 126, 128 may be used to couple and decouple certain circuit elements together to form an impedance matching network 1301, 1302, or 1303 that matches the input impedance of the communication circuit 101 with the fixed output impedance of the antenna 110.

Each impedance matching network 1301, 1302, 1303 is associated with at least one of a plurality of states of the device 10' and is designed to optimize the impedance matching between the antenna 110 and the communication circuit 101 when the device 10' is in the respective associated state (i.e when the associated state is selected). For example, the wireless device 100 may include a first impedance matching network 1301 (Config. A of FIG. 4) that is configured to optimize the impedance match between the antenna 110 and the communication circuit 101 when the device 10' is in a first state, such as an closed physical state. In such an example, a second impedance matching network 1302 (Config. B of FIG. 4) is configured to optimize the impedance match between the antenna 110 and the communication circuit 101 when the device 10' is in a second state, such an open physical state. In another example, the wireless device may include an impedance matching network that is configured to optimize the impedance match between the antenna 110 and the communication circuit 101 when the device 10' is in a positional state such that it is near the body of the user, such as a hand-held positional state, and another impedance matching network that is configured to optimize the impedance match between the antenna 110 and the communication circuit 101 when the device 10' is in a positional state such that it is further away from the body, such as in a free-space positional state.

It is also possible that an impedance matching network 1301, 1302, 1303 may be associated with a combination of states of the device 10' and optimize the impedance match when the device 10' is in a combination of states. For example, the wireless device 100 may include a first impedance matching network 1301 configured to optimize the impedance match between the antenna 110 and the communication circuit 101 when the device 10' is in a closed physical state and in a positional state such that the device 10' is near the body of the user. Then, the second impedance matching network 1302 might optimize the impedance match between the antenna 110 and the communication circuit 101 when the device 10' is in a closed physical state and in a positional state such that the device 10' is not near the body of the user. In turn, a third impedance matching network 1303 would optimize the impedance match between the antenna 110 and the communication circuit 101 when the device 10' is in an open physical state and in a positional state such that the device 10' is near the body of the user, whereas a fourth impedance matching network (not shown) might be configured to optimize the impedance match between the antenna 110 and the communication circuit 101 when the device 10' is in an open physical state and in a positional state such that the device 10' is not near the body of the user.

The switching circuit 126, 128 illustrated in FIG. 4 can selectively couple the antenna 110 to the communication circuit 101 using one of the impedance matching networks 1301, 1302, 1303 based on the states of the device 10'. In the example shown in FIG. 4, the switching circuit includes a first switch 126 and a second switch 128. The first switch 126 selectively couples the antenna 110 to an impedance matching network 1301, 1302, 1303 based on the states of the device 10' with which the selected impedance matching network 1301, 1302, 1303 is associated. The second switch 128 selectively couples the communication circuit 101 to the same impedance matching network 1301, 1302, 1303. In this manner, the antenna 110 is coupled to the communication circuit 101 with the impedance matching network 1301, 1302, 1303 associated with the selected state of the device 10'. It is understood that when the switching circuit 126, 128 couples a selected impedance matching network, such as impedance matching network 1301, the other impedance matching networks 1302, 1303 are decoupled from the antenna 110 and the communication circuit 101.

As explained above, the sensor circuit 122 may be used to detect the selected state of the device 10' and may send a control signal to the microprocessor 112 and/or the switching circuit 126, 128 which is indicative of the selected state of the device 10'. The switching circuit may selectively couple an associated impedance matching network 1301, 1302, 1303 based on receiving a control signal from the sensor circuit 122 indicating one or more selected states of the device 10'. Alternatively, the switching circuit may receive a control signal from the microprocessor 112 which indicates the selected state of the device 10'. It is understood that other methods may be used to provide an indication of the selected state of the device 10' to the switching circuit 126, 128.

During operation, upon receiving an indication of the selected state of the mobile communication device 10', the switching circuit 126, 128 couples the antenna 110 to the communication circuit 101 with a selected impedance matching network 1301, 1302, 1303 that is associated with the selected state of the device 10'. It is understood that the selected impedance matching network 1301, 1302, 1303 is associated with the selected state of the device 10' is configured to optimize the impedance matching circuit between the communication circuit 101 and the antenna 110.

As explained above, in one example, each impedance matching network 1301, 1302, 1303 may comprise a set of circuit elements that are separate from the circuit elements for other impedance matching network 1301, 1302, 1303. In such a configuration, the switching circuit 126, 128 may couple the selected impedance matching network 1301, 1302, 1303 to the antenna 110 and the communication circuit 101. Alternatively, each impedance matching network 1301, 1302, 1303 may comprise a set of circuit elements, some of which may be shared with other impedance matching networks 1301, 1302, 1303. In this type of configuration, the switching network may couple only the circuit elements that make up the selected impedance matching network 1301, 1302, 1303 to the antenna 110 and the communication circuit 101 in a manner that matches the input impedance of the communication circuit 101 with the fixed output impedance of the antenna 110. For example, the first impedance matching network 1301 might provide common elements for a desired impedance for the expected most common state (or possibly the lowest impedance). Then, the other impedance matching network 1302, 1303 would include elements to be switched-in or added to the impedance of network 1301 in ways to provide desired changes to other impedance levels for tuning with regard to second and third states of the device.

In one example, the flash type program memory 114 includes an executable program code execution of which by the microprocessor 112 controls the switch operations for coupling a selected impedance matching network 1301, 1302, 1303 to the antenna 110 and the communication circuit 101. The program code may executed by the microprocessor 112 or some other component in the mobile communication device 10 that is capable of executing program code to implement the function of coupling the appropriate impedance network. In operation, the microprocessor 112 (or other component) receives a control signal indicating the selected state of the device 10', e.g. from the sensor 122. In response, the microprocessor 112 may send a control signal to the switching circuit 126, 128 causing the switching circuit 126, 128 to couple the antenna 110 to the communication circuit 101 with the impedance matching network 1301, 1302, 1303 which is associated with the selected state of the device 10'. In the case of the example shown in FIG. 4, the control signal from the microprocessor 112 causes the first switch 126 to couple the antenna 110 to the impedance matching network 1301, 1302, 1303 associated with the selected state of the device 10' and the second switch 128 couples the communication circuit 101 to the same impedance matching network 1301, 1302, 1303. In this manner, the antenna 110 is coupled to the communication circuit 101 through the impedance matching network 1301, 1302, 1303 associated with the selected state of the device 10'.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A mobile communication device comprising:
   an antenna;
   a first housing;
   a second housing movably connected to the first housing and capable of moving from a closed position relative to the first housing in which the mobile communication device is in a closed physical state to an open position relative to the first housing in which the mobile communication device is in an open physical state;
   a communication circuit for transmitting and receiving communication signals;
   a sensor circuit having a plurality of different types of sensors, the sensor circuit being configured to detect selectable states of the mobile communication device and generate a control signal for indicating the detected selectable states, wherein the different types of sensors include:
   (a) a first type of sensor configured to detect when the mobile communication device is in the open physical state and when the mobile communication device is in the closed physical state, and
   (b) a second type of sensor configured to detect other selectable states of the mobile communication device different from the open and closed physical states, the other selectable states of the mobile communication device, including a first orientation state of the mobile communication device and a second orientation state of the mobile communication device;
   a first impedance matching network configured to optimize the impedance match between the antenna and the communication circuit when the mobile communication device is in the closed physical state and the first orientation state;
   a second impedance matching network configured to optimize the impedance match between the antenna and the communication circuit when the mobile communication device is in the open physical state and the second orientation state; and
   a switching network configured to receive the control signal from the sensor circuit and to selectively couple the antenna to the communication circuit with one of the first impedance matching circuit and the second impedance matching circuit, based on open or closed state detection by the first type sensor circuit and first or second orientation state detection by the second type sensor.

2. The mobile communication device of claim 1, wherein:
   the closed physical state corresponds to a first mode of operation;
   the open physical state corresponds to a second mode of operation;
   positioning the second housing to place the mobile communication device in the closed physical state causes the switching network to couple the antenna to the communication circuit with the first impedance matching circuit; and
   positioning the second housing to place the mobile communication device in the open physical state causes the switching circuit to couple the antenna to the communication circuit with the second impedance matching circuit.

3. The mobile communication device of claim 1, wherein the first impedance matching circuit and the second impedance matching circuit comprise at least one common circuit element.

4. The mobile communication device of claim 1, wherein:
   the first impedance matching circuit comprises a first set of circuit elements;
   the second impedance matching circuit comprises a second set of circuit elements; and
   the first set of circuit elements are distinct from the second set of circuit elements.

5. The mobile communication device of claim 1, wherein the switching network comprises:
   a first switching network for coupling the antenna to the first impedance matching circuit when the mobile communication device is in the closed physical state and coupling the antenna to the second impedance matching circuit when the mobile communication device is in the open physical state; and
   a second switching network for coupling the communication circuit to the first impedance matching circuit when the mobile communication device is in the closed physical state and coupling the communication circuit to the second impedance matching circuit when the mobile communication device is in the open physical state.

6. The mobile communication device of claim 1, wherein:
   the first type sensor comprises a slider or flip sensor; and
   the second type sensor comprises an accelerometer configured to sense orientation of the mobile communication device.

7. An article of manufacture comprising:
   a sensor circuit having a plurality of different types of sensors, the sensor circuit being configured to detect selectable states of a mobile communication device and generate a control signal indicating the detected selectable states, wherein the different types of sensors include:
   (a) an open/closed state sensor configured to detect when the mobile communication device is in an open physical state and when the mobile communication device is in a closed physical state, and
   (b) an orientation sensor configured to detect when the mobile communication device is in a first orientation state and when the mobile communication device is in a second orientation state;
   an impedance matching circuit having a plurality of impedance matching networks, wherein each impedance matching network is associated with one of the open or closed physical states and at least one of the orientation states of the mobile communication device and is configured to optimize the impedance match between the communication circuit and the antenna based on the detected states of the mobile communication device with which the impedance matching network is associated; and a switching circuit configured to selectively couple an antenna to a communication circuit with one of the impedance matching networks based on the control signal from the sensor circuit.

8. The article of manufacture of claim 7, wherein:

the impedance matching circuit comprise a first impedance matching network associated with a first selected state of the mobile communication device and a second impedance matching network associated with a second selected state of the mobile communication device, the first impedance matching network couples the antenna to the communication circuit when the mobile communication device is in the first selected state, and the second impedance matching network couples the antenna to the communication circuit with the mobile communication device is in the second selected state.

9. The article of manufacture of claim 8, wherein the first impedance matching network and the second impedance matching network comprise at least one common circuit element.

10. The article of manufacture of claim 8, wherein:

the first impedance matching network comprises a first set of circuit elements, the second impedance matching network comprises a second set of circuit elements, and the first set of circuit elements are distinct from the second set of circuit elements.

11. The article of manufacture of claim 8, wherein the switching network comprises:

a first switching network for coupling the antenna to a selected one of the plurality of impedance matching networks based on a state of the mobile communication device with which the selected one of the plurality of impedance matching networks is associated; and a second switching network for coupling the communication circuit to the selected one of the plurality of impedance matching networks based on the state of the mobile communication device with which the selected one of the plurality of impedance matching networks is associated.

12. The article of manufacture of claim 8, wherein:

the open/closed state sensor comprises a slider or flip sensor; and the orientation state sensor comprises an accelerometer configured to sense orientation of the mobile communication device.

* * * * *